United States Patent

Ellis et al.

[15] 3,693,170

[45] Sept. 19, 1972

[54] MEMORY CELLS

[72] Inventors: Alfred Brian Edwin Ellis, Chelmsford; Colin James Shead, Witham, both of England

[73] Assignee: The Marconi Company Limited, London, England

[22] Filed: Nov. 13, 1970

[21] Appl. No.: 89,204

[30] Foreign Application Priority Data

Aug. 5, 1970 Great Britain..........37,782/70

[52] U.S. Cl. ..............................340/173 FF, 307/238

[51] Int. Cl. ............................................G11c 11/40

[58] Field of Search..................340/173 FF; 307/238

[56] References Cited

UNITED STATES PATENTS 3,440,444 4/1969 Rapp....................340/173 FF 3,518,635 6/1970 Cole et al.............340/173 FF 3,548,389 12/1970 Ellis......................340/173 FF

OTHER PUBLICATIONS

IBM Tech. Disc. Bulletin, " Associative Memory Cell" by Behnke Vol. 10 No. 11, 4/68 pages 1715, 1716

*Primary Examiner*—Stanley M. Urynowicz, Jr.
*Attorney*—Baldwin, Wight & Brown

[57] ABSTRACT

An electronic memory cell consists of a bistable and three access paths. Two of the access paths control the state of the bistable. Connected between the two access paths controlling the state of the bistable and the third access path is a M.O.S. transistor whose impedance varies in dependence upon the state of the bistable.

10 Claims, 2 Drawing Figures

PATENTED SEP 19 1972

3,693,170

SHEET 1 OF 2

Figure 1:
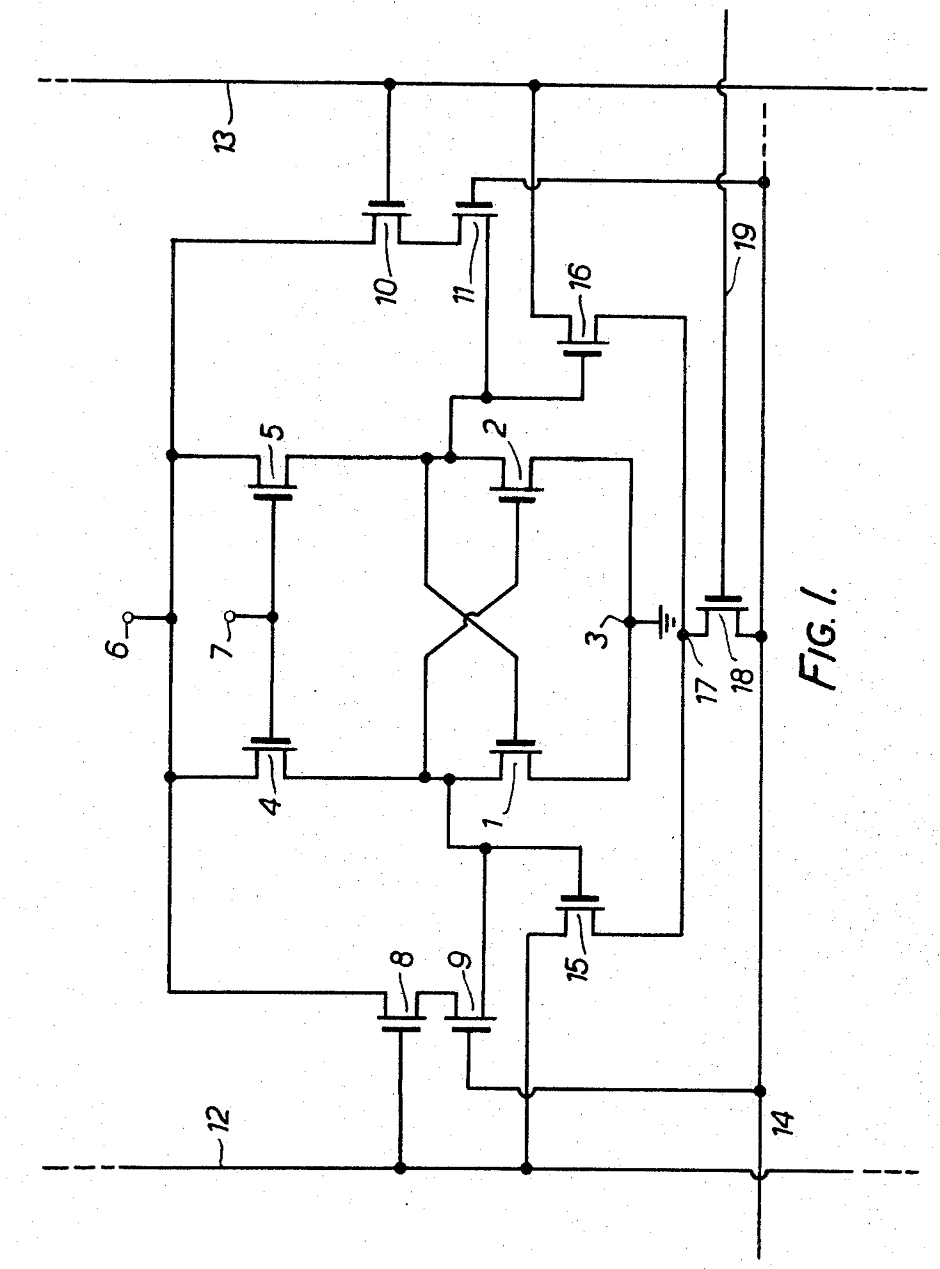

INVENTORS
Alfred Brian Edwin Ellis
and
Colin James Shead
BY Baldwin Wight & Brown ATTORNEYS INVENTORS
Alfred Brian Edwin Ellis
and
Colin James Shead
BY Baldwin Wight & Brown ATTORNEYS

MEMORY CELLS

This invention is an improvement in or modification of the invention in the copending United States application of Clive William Hoggar, Ser. No. 63,679 filed Aug. 14, 1970, and relates to memory cells and memory cell arrangements.

According to said copending application a memory cell comprises a bistable circuit, first, second and third signal access paths, the first and second of said paths being arranged to switch said bistable circuit to one or other of its stable states to store a "1" or a "0" as the case may be, and two selectably low impedance paths, one connected between said first and said third paths and one connected between said second and said third paths, said selectably low impedance paths being arranged to be controlled by the state of said bistable circuit so that in one of its states one of said paths is of low impedance and the other of high impedance whilst in the other of its states the other of said paths is of low impedance and the one is of high impedance.

According to this invention said selectably low impedance paths are connected between said first and said third signal access paths and between said second and said third signal access paths via selectably low impedance means. The selectably low impedance means may be common to said first and said second signal access paths, said two selectably low impedance paths being connected to a common point which is in turn connected to said third signal access path by said common selectably low impedance means. Preferably said selectably low impedance means is a P-type M.O.S. transistor having its source to drain path connected between said common point and said third signal access path and a control lead connected to its gate electrode.

Preferably said bistable circuit comprises two P-type M.O.S. transistors each having a drain load, the gate electrode of one being connected to the drain electrode of the other, and vice versa, two further selectably low impedance paths being provided one connected across the drain load of one of said two transistors and the other across the drain load of the other, whereby said bistable circuit may be set to one state by selecting one of said further selectably low impedance paths to be of low impedance and the other by selecting the other of said selectably low impedance paths to be of low impedance.

Preferably again, said first mentioned two selectably low impedance paths each comprises a M.O.S. transistor, one having its drain electrode connected to said first signal access path, its source electrode connected to said third signal access path via said selectably low impedance means and its gate electrode connected to one of the active elements comprising the bistable circuit and the other having its drain electrode connected to said second signal access path, its source electrode connected to said third signal access path via said selectably low impedance means and its gate electrode connected to the other of the active elements comprising the bistable circuit. Where the active elements comprising the bistable circuit are M.O.S. transistors the gate electrodes of the M.O.S. transistors comprising said first mentioned two selectably low impedance paths are connected to the appropriate drain electrodes of the M.O.S. transistors comprising the bistable circuit.

Preferably again, said further two selectably low impedance paths each comprises two M.O.S. transistors connected with their source to drain paths in series across the drain load of one of the active elements comprising the bistable circuit, one of the serially connected two transistors having its gate electrode connected to the third signal access path and the other having its gate electrode connected to an appropriate one of the first and second signal access paths.

An associative memory store in accordance with this invention comprises an array of memory cells as above described connected with common first, second and third signal access paths and common control leads to said selectably low impedance means.

Figure 2:
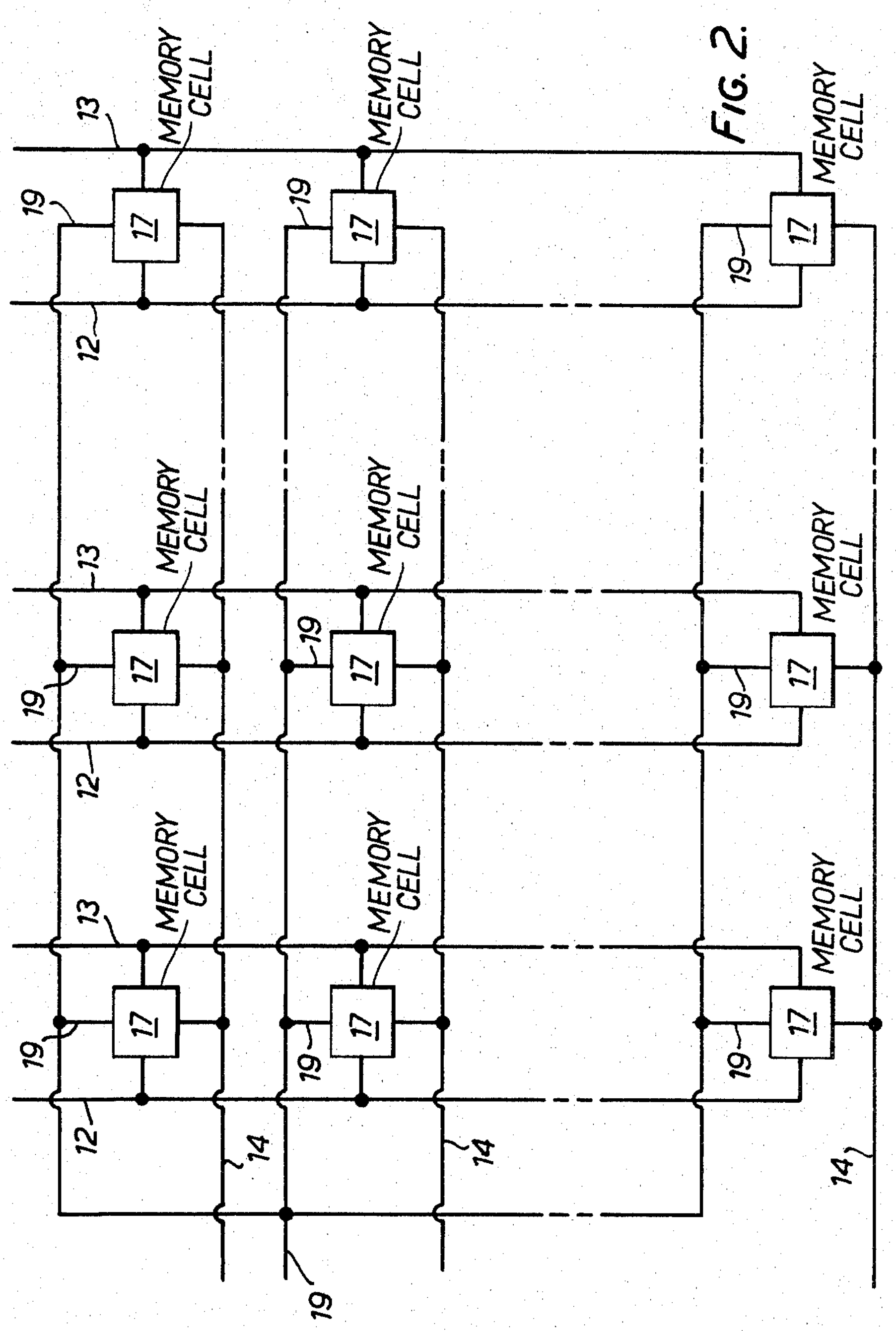

The invention is illustrated in and further described with reference to the accompanying drawings, in which:

FIG. 1 is a circuit diagram of a single memory cell in accordance with the present invention, and FIG. 2 is a block diagram of a plurality of single memory cells interconnected to form an associative memory store.

Referring to FIG. 1, two M.O.S. transistors 1 and 2 of the P-channel type are arranged each with its gate electrode connected to the drain electrode of the other to form a bistable circuit. The source electrodes of transistors 1 and 2 are connected together and to earth at 3.

Two further M.O.S. transistors, 15 and 16, again of the P-type are provided each constituting a selectably low impedance path. Transistor 15 has its gate electrode connected to the drain electrode of transistor 1, its drain electrode connected to first signal access path 12 and its source electrode connected to a common point 17 to which the source electrode of transistor 16 is also connected. The gate electrode of transistor 16 is connected to the drain electrode of transistor 2, while its drain electrode is connected to second signal access path 13. The common point 17 is connected to the drain electrode of a further P-type M.O.S. transistor 18 provided as a selectably low impedance means, the source electrode of which is connected to the third access signal path 14. The gate electrode of transistor 18 is connected to a "write condition" enabling control lead 19.

Two further M.O.S. transistors, 4 and 5, again of the P-channel type, are connected to provide the drain loads of transistors 1 and 2. The drain electrodes of transistors 4 and 5 are connected together and to a terminal 6 to which potential from a reference source (not shown) is applied. Terminal 6 is maintained at 20 volts negative with respect to earth 3. Transistors 4 and 5 act merely as passive circuit elements. The gate electrodes of transistors 4 and 5 are connected together and to a terminal 7 to which gate bias potential is applied from a source (not shown) such that the drain-to-source resistance of each of transistors 4 and 5 is of the order of 500 KΩ.

Across the source-drain path of transistor 4 are connected two further M.O.S. transistors, 8 and 9, again of the P-channel type, in series. The drain electrode of transistor 8 is connected to the drain electrode of transistor 4 while the source electrode of transistor 8 is connected to the drain electrode of transistor 9. The source electrode of transistor 9 is connected to the source electrode of transistor 4.

Across the source-drain path of transistor 5 are connected two further M.O.S. transistors, 10 and 11, again of the P-channel type, in series. The drain electrode of transistor 10 is connected to the drain electrode of transistor 5 while the source electrode of transistor 10 is connected to the drain electrode of transistor 11. The source electrode of transistor 11 is connected to the source electrode of transistor 5.

The serially connected transistors 8 and 9 and the serially connected transistors 10 and 11 comprise two further selectably low impedance paths.

The gate of transistor 8 is connected to a first access signal path 12 to which, in operation, "0" digits to be stored are applied. The gate of transistor 10 is connected to a second signal access path 13 to which, in operation, "1" digits to be stored are applied.

The gates of transistors 9 and 11 are both connected to a third access signal path 14 to which, in operation, read-out signals are applied when a digit stored in the cell is to be read out.

The operation of the single cell shown in FIG. 1 will now be described. In the quiescent state with no signal present on any of the signal access paths 12, 13 or 14, the cell may contain either a "0" or a "1." The "0" state is that state in which transistor 1 is OFF (i.e., the drain-to-source path of the transistor is high) and transistor 2 is ON (i.e., the drain-to-source path of the transistor is low). The "1" state is that state in which transistor 1 is ON and transistor 2 is OFF.

Signal access paths 12, 13 and 14 are normally held at the reference potential at 3, i.e., earth potential, and transistor 18, is in a conducting state so that the sources of transistors 15 and 16 are connected to signal access path 14.

To write a "1" into the memory cell shown in "write condition" enabling control lead 19 is earthed, thus switching off transistor 18, and simultaneously signal access path 13 is pulsed to −30 volts and signal access path 14 is pulsed to −20 volts. This switches transistors 10 and 11 on. The voltage developed across transistor 2 exceeds the gate threshold voltage value of transistor 1 which is thus switched on. Transistor 2 then switches off due to the normal regenerative action of the flip-flop. If a "1" is already contained in the cell, no switching action will occur since there will be virtually no potential difference across the series combination of transistors 10 and 11.

To write a "0" into the cell, signal access path 12, instead of path 13, is pulsed to −30 volts while "write condition" enabling control lead 19 is earthed and signal access path 14 is pulsed to −20 volts. This switches on transistors 8 and 9. The voltage developed across transistor 1 exceeds the gate threshold voltage value of transistor 2 which is thus switched on. Transistor 1 then switches off due to the normal regeneration action of the flip-flop. Again if a "0" is already contained the cell there will be no switching action since there will be virtually no potential difference across the series combination of transistors 8 and 9.

So far as reading-out the signal stored in the cell is concerned, the operation is as follows. If the signal stored in the cell is a "1," transistor 1 is ON and transistor 2 is OFF as previously defined. In this state the gate voltage of transistor 16 is negative and this transistor is therefore in the ON state which provides a low impedance path from the signal access path 14 to the signal access path 13. To read the contents of the memory cell −20 volts is applied to the "write condition" enabling control lead 19 so as to render transistor 18 conductive and the signal access path 14 is pulsed to −4 volts with respect to the reference potential at 3. Accordingly, if a "1" is present in the memory cell the voltage pulse applied to signal access path 14 causes current to flow in the signal access path 13, which may be detected by a current detector (not shown) connected thereto. The state of the memory cell remains unchanged since at this time transistor 10 is in the OFF state. Similarly, if instead of containing a "1" the memory cell had contained a "0" the current pulse applied to signal access path 14 would have passed through transistor 15 to signal access path 12 and have been detected by a current detector (not shown) connected to the signal access path.

It is also possible to operate the cell in what is known as a search mode, in which case −20 volts is again applied to "write condition" enabling control lead 19 so as to render transistor 18 conductive. To search for a "1" in the memory cell the signal access path 12 is pulsed to −4 volts. If the cell contains a "0" then, as previously stated, transistor 1 if OFF and transistor 2 is ON, and hence as transistor 15 is ON a low impedance path is provided between signal access path 12 and signal access path 14. The −4 volt pulse applied to the signal access path 12 causes a current pulse to flow in signal access path 14. This effect is termed a mismatch condition, and may be detected by a current detector or low impedance amplifier (not shown) connected to signal access path 14. If however the memory cell does contain a "1" the transistor 15 will be OFF and a high impedance path is presented between signal access path 12 and signal access path 14 and accordingly no current flows in signal access path 14 and no signal is detected by the detector connected thereto.

Similarly, to search for a "0" the signal access path 13 is pulsed to −2 volts, and if the memory cell contains a "1" a signal is obtained on signal access path 14 which may be detected, or if the memory cell does contain a "0" no signal is detected by the detector connected to signal access path 14.

Referring to FIG. 2, the associative memory consists of an array of individual memory cells 17 each of which is as shown in FIG. 1. The signal access paths 14 of each memory cell are common to all bits in a word, and the signal access paths 12 and 13 are common to all corresponding bits in the memory array. The "write condition" enabling control leads 19 are common to all of the memory cells 17. In the search mode previously described the current detector (not shown) connected to signal access path 14 provides an OR function which detects the presence of one or more mismatch currents from one or more digits in a word.

Compared with the parent invention, providing the selectably low impedance means constituted by transistor 18 to enable the "write condition" enables the low driving impedances associated with the write mode in the parent invention to be overcome. Furthermore, the connection of the further selectably low impedance paths, constituted by transistors 8 and 9, and 10 and 11, across the drain loads of transistors 1 and 2 to achieve the hereinbefore described method of changing the state of the bistable circuit formed by transistors 1 and 2, has the advantage that the capacitance associated with the gate electrode of transistors 1 or 2 is charged via the selected low impedance of transistors 8 and 9, or 10 and 11, as the case may be, rather than via the high resistance of transistors 4 or 5 as in the circuit arrangement described and illustrated in the parent specification. This results in a considerable increase in the so-called toggle action (i.e., the rate at which changes of state may be induced) of the bistable circuit formed by transistors 1 and 2.

We claim:

1. A memory cell comprising, in combination:

a bistable circuit having first and second output terminals, one for each of two stable states;

first, second and third signal access paths;

first selectable low impedance path means for connecting said first and said third signal access paths to read out one stable state of said bistable circuit and second selectably low impedance path means for connecting said second and said third signal access paths to read out the other stable state of said bistable circuit, said first selectably low impedance path means comprising a first selectable low impedance means controlled by said one output terminal of the bistable circuit and a further selectably low impedance means in series with said first selectably low impedance means, said further selectably low impedance means having an input terminal for rendering such further means selectably of low impedance to read out of the bistable circuit and of high impedance to write in to the bistable circuit, and said second selectably low impedance path means comprising a second selectably low impedance means controlled by said second output terminal of the bistable circuit and said further selectably low impedance means in series with said second selectably low impedance means; and third selectably low impedance path means controlled by said first and said third signal access paths for writing in one stable state to said bistable circuit; and fourth selectably low impedance path means controlled by said second and said third signal access paths for writing in said other stable state to said bistable circuit.

2. A memory cell comprising, in combination:

a bistable circuit having two output terminals, one for each of two stable states;

first, second and third signal access paths;

first means controlled by said first and said third signal access paths for writing in one stable state to said bistable circuit and second means controlled by said second and said third signal access paths for writing in the other stable state to said bistable circuit; and selectably low impedance path means having write in and read out control and controlled by said first and said second output terminals of said bistable circuit for (a) establishing high impedance between said first and said third and between said second and said third signal access paths when either of said first and second means are operative, (b) establishing low impedance between said first and said third signal access paths when said one stable state is read out and (c) establishing low impedance between said second and said third signal access paths when said other stable states is read out.

3. A memory cell comprising a bistable circuit having two output terminals, one for each stable state; first, second and third signal access paths for writing in and reading out with respect to said bistable circuit; and two selectably low impedance paths, one connected between said first and said third signal access paths and the other connected between said second and said third signal access paths, one of said output terminals being connected to control the state of one of said selectably low impedance paths and the other of said output terminals being connected to control the state of the other of said selectably low impedance paths according to the state of said bistable circuit, wherein the selectably low impedance paths are connected between said first and said third signal access paths and between said second and said third signal access paths via selectably low impedance means.

4. An associative memory store comprising an array of memory cells each as claimed in claim 1 and connected with common first, second and third signal access paths and common control leads to said selectably low impedance means.

5. A memory cell as claimed in claim 3 and wherein the selectably low impedance means is common to said two selectably low impedance paths, said two selectably low impedance paths being connected to a common point which is in turn connected to said third signal access path by said common selectably low impedance means.

6. A memory cell as claimed in claim 5 and wherein said selectably low impedance means is a P-type M.O.S. transistor having its source-to-drain path connected between said common point and said third signal access path and a control lead connected to its gate electrode.

7. A memory cell as claimed in claim 3 and wherein said bistable circuit comprises two p type M.O.S. transistors each having a drain load, the gate electrode of one being connected to the drain electrode of the other, and the drain electrode of said one being connected to the gate electrode of the other, two further selectably low impedance paths being provided one connected across the drain load of one of said two transistors and the other across the drain load of the other for setting said bistable to one or the other of its two stable states.

8. A memory cell as claimed in claim 7 and wherein said further two selectably low impedance paths each comprises two M.O.S. transistors connected with their source-to-drain paths in series across the drain load of one of the active elements comprising the bistable circuit, one of the serially connected two transistors having its gate electrode connected to the third signal access path and the other having its gate electrode connected to an appropriate one of the first and second signal access paths.

9. A memory cell as claimed in claim 7 and wherein said first mentioned two selectably low impedance paths each comprises a M.O.S. transistor, one having its drain electrode connected to said first signal access path, its source electrode connected to said third signal access path via said selectably low impedance means and its gate electrode connected to one of the active elements comprising the bistable circuit and the other having its drain electrode connected to said second signal access path, its source electrode connected to said third signal access path via said selectably low impedance means and its gate electrode connected to the other of the active elements comprising the bistable circuit.

10. A memory cell as claimed in claim 9 wherein the gate electrodes of the M.O.S. transistors comprising said first mentioned two selectably low impedance paths are connected to the appropriate drain electrodes of the M.O.S. transistors comprising the bistable circuit.

* * * * *